May 20, 1969     H. B. SCHULTZ     3,445,142
CONTROL VALVE
Original Filed March 8, 1967
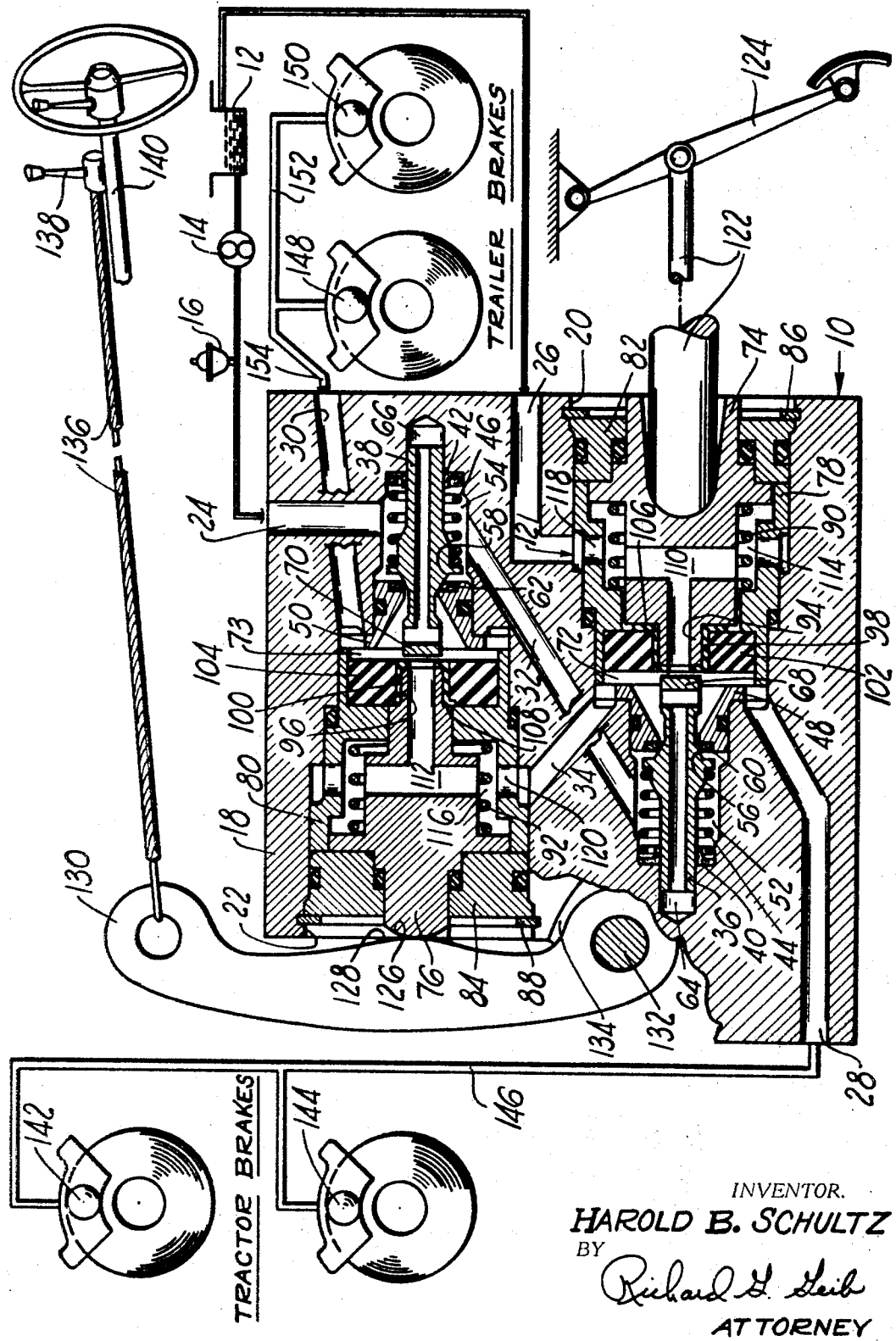
INVENTOR.
HAROLD B. SCHULTZ
BY
Richard G. Geib
ATTORNEY United States Patent Office 3,445,142
Patented May 20, 1969

3,445,142
CONTROL VALVE
Harold B. Schultz, South Bend, Ind., assignor to The Bendix Corporation, a corporation of Delaware
Continuation of application Ser. No. 622,880, Mar. 8, 1967. This application Aug. 8, 1968, Ser. No. 753,843
Int. Cl. B60t 13/00, 13/16
U.S. Cl. 303—53      9 Claims

ABSTRACT OF THE DISCLOSURE

A fluid pressure control device having two valves in a housing with means whereby operation of one valve overrides the control of the other. Thus, the pressure built up by operation of one of the valves will cause operation of the other valve. The other valve may be also operated independent of the operation of the first valve.

This is a continuation of Ser. No. 622,880 filed Mar. 8, 1967, now abandoned.

Summary

Recent developments in vehicle braking has increased fluid displacement requirements beyond the safety factor of practical closed fluid system such as is exemplified by master cylinder controlled brakes. The need for control means of unlimited displacement is not only attendant to automobiles, but to vehicle trains such as tractor trailer vehicles and automobile trailer combinations. In such trains it is desirable to have combined primary vehicle and secondary vehicle braking, as well as independent secondary or trailer braking. Thus, the principal problem solved by this invention is that associated with providing a simple, practical, and economical control means for such separate fluid pressure systems as found in tractor-trailer braking and the like. It should also be noted that while this invention has been devised for a particular observation it has application in other applications, as will be appreciated by those skilled in the art.

Drawing description

The drawing shows in cross section a control valve in accordance with this invention in a schematic system of tractor-trailer brakes of the future as visualized presently.

Detailed description

With more particular reference to the drawing there is shown a hydraulic control valve 10 for use in a hydraulic system including a fluid reservoir 12, an engine driven pump 14 and an accumulator 16.

The control is constructed by casting a housing 18 which is thereafter machined to have finished bores 20 and 22 as well as an inlet port 24, a return port 26, discharge ports 28 and 30 and internal passages 32 and 34 between the bores 20 and 22.

Valve poppets 36 and 38 are then inserted in the respective bores with "Teflon" seals 40 and 42 biased by springs 44 and 46 onto a shoulder of the bore. The springs 44 and 46 urge poppets 36 and 38 towards the open end of the bores. Annular valve seats 48 and 50 are press fitted in the bore to contain the poppets 36 and 38 and create fluid pressure chambers 52 and 54 about the poppets closed by the spring urged abutment of respective valve faces 56 and 58 on hard, but yet deformable rings 60 and 62 of the valve seats 48 and 50. As seen, the chambers 52 and 54 are open to each other by passage 32 in the housing 18 and to the inlet port 24.

The poppets 36 and 38 have an axial passage leading from the bore ends 64 and 66 to radial openings in the poppets' free ends 68 and 70 extending through the valve seats 48 and 50 into control chambers 72 and 73. The poppets are preferably machined to have reduced diameter portions adjacent the valve faces abutment with the rings 60 and 62 with each end, free and slidably supported, of equal diameter. This will provide pressure balancing of the valve poppets in the open attitude and pressure unbalance in the closing direction in the closed attitude.

The open end of the bores 20 and 22 is closed behind the valving by slidable valve actuators 74 and 76 carried in the bore by sleeves 78 and 80 and collars 82 and 84 held by snap rings 86 and 88. Springs 90 and 92 abut the actuators 74, 76 on the collars 82 and 84 in the assembled attitude.

The actuators are manufactured to have tubular projections 94 and 96 with hard but deformable caps 98 and 100 over the ends within deformable reaction discs 102 and 104 carried by sleeves 78 and 80. The tubular projections have flanges or shoulders 106 and 108 abutting the discs 102 and 104 on surfaces of differing area so that reaction force in chamber 73 will be less on actuator 76 than reaction force in chamber 72 is on actuator 74. The tubular projections open to radial passages 110 and 112 in the actuators that is open to spring cavities 114 and 116 between the actuators and their respective sleeves, and sleeves 78 and 80 have radial openings 118 and 120 opening cavities 114 and 116 to the bores 20 and 22 adjacent, respectively, return port passage 121 and passage 34.

A push rod 122 connected to a brake pedal 124, as may be found pivotally mounted in the cab of the tractor, and to the actuator 74 which is shown as an abutment connection.

Actuator 76 is provided with a surface of revolution 126 that abuts a similar surface 128 of a lever 130 pivoted, as at 132, to ear 134 of housing 18. Lever 130 is connected by a cable 136 to a hand control lever 138 attached to a steering column 140, also within the tractor cab.

The braking system is shown as having front and rear tractor disc brakes 142 and 144 connected by a conduit 146 to discharge port 28, and trailer axle disc brakes 148 and 150 connected by a trailer conduit 152, via a quick disconnect (not shown) to a conduit 154 in the tractor leading to discharge port 30.

Operation

In the released attitude of valve 10, as shown by the drawing, hydraulic pressure is held in chambers 52 and 54. The disc brakes 148 and 150 as well as disc brakes 142 and 144 are under no pressure as control chambers 72 and 73 are connected via passages 34 and 121 to return port 26.

Upon depression of brake pedal 124 actuator 74 first abuts cap 98 on free end 68 to close off communication of chambers 72 and 73 to return port 26. Further depression will cause actuator 74 to unseat poppet face 56 from ring 60 and around poppet 36 port hydraulic pressure to chamber 72. This pressure, in addition to being conveyed by port 28 and conduit 146 to brakes 142 and 144, will pass via passages 34 and 112 to chamber 73 where it is open to discharge port 30 and through coupled lines 154 and 152 to disc brakes 148 and 150 of the trailer. Thus, the entire braking system is actuated upon working of brake pedal 124.

Control pressure in chamber 72 will act on disc 102 and thereby be proportioned between housing 18 thru sleeve 78 and actuator 74 to provide a sense of "feel" to the operator of the brake pedal. This same pressure acts across the shoulder 108 and in the spring cavity 116 to oppose actuation of actuator 76 by hand control 130. In addition, control chamber pressure across the poppets 36 and 38 due to bore ends 64 and 66 augment seating forces of springs 44 and 46.

If it is desired to effect a pulling brake effect by the trailer prior to braking by pedal 124, hand lever 138 is operated to cause lever 130 to pivot about 132 and move actuator 76 inwardly to first lap cap 100 on free end 70 and then move poppet 38, as did the actuator 74 move poppet 36 aforementioned. In this instance, and depending on the strength of the cable 136 and mechanical advantage of hand control 138, the "feel" is provided by the limited area shoulder 108 of actuator 76. The use of surfaces of revolution between lever 130 and actuator 76 precludes substantial frictional interference in this actuation which is one of applying rotational force to axially reciproctae actuator 76.

I claim:
1. Control means comprising:
 a housing at least a first bore and a second bore therein with passage means therebetween divided into segregated first, second and third portions, said first portion connecting an inlet port for one bore of said housing to the other bore, and said second portion connecting a return port to one bore and a third portion connecting one bore of said housing to the other bore, said housing being further provided with a first discharge port for said first bore and a second discharge port for said second bore;
 first valve means in said first bore dividing said first bore into a first inlet chamber, a first control chamber and a first return chamber such that said first control chamber and said first return chamber are normally in fluid communication until actuation of said first valve means to close same and open said first inlet chamber to said first control chamber to port fluid from said first inlet chamber to said first discharge port open to said first control chamber, said first control chamber being connected to said third portion of said passage means of said housing;
 second valve means in said second bore dividing said second bore into a second inlet chamber, a second control chamber and a second return chamber such that said second control chamber and said second return chamber are normally in fluid communication until actuation of said second valve means to close same and open said second inlet chamber to said second control chamber to port fluid from said second inlet chamber to said second discharge port open to said second control chamber, said second return chamber being connected to said third portion of said passage means of said housing such that said first control chamber and said second return chambert are in fluid communication;
 first and second control actuating means independent of each other and separately connected to said first valve means and said second valve means to operate said first and second valve means such that said first valve means' operation supplies fluid pressure to both said first discharge port and said second discharge port and said second valve means' operation supplies fluid pressure to said second discharge port only.

2. Control means according to claim 1 wherein said first and second valve means have separate first and second reaction means effective only on the respective first and second control actuating means whereby one reaction means does not add reaction forces on the other.

3. Control means according to claim 1 wherein said first and second control actuating means are operatively arranged respectively with respect to said first and second valve means on opposite ends of said housing such that said valve means move in opposite directions with respect to each other in their respective bores of said housing.

4. Control means according to claim 2 wherein said first and second control actuating means are operatively arranged respectively with respect to said first and second valve means on opposite ends of said housing such that said valve means move in opposite directions with respect to each other in their respective bores of said housing.

5. Control means comprising:
 a housing including, a first bore, a second bore, passage means between said first bore and said second bore, an inlet port communicated to said first bore and via a first portion of said passage means to said second bore, a return port communicated to said second bore and via a second portion of said passage means to said first bore, a first discharge port in communication with said first bore, and a second discharge port in communication with said second bore;
 a first valve means in said first bore including, a first valve poppet slidably guided in the end of said first bore and biased away from said end, said poppet having the first valve face spaced inwardly of its end slidably guided within said first bore, a first valve seat affixed in said first bore to said housing, said first valve seat including a second valve face on which said first valve face abuts to form a first pressure chamber in said bore open to said inlet port and to said first portion of said passage means, a first valve actuating means operatively arranged in said bore having a first reaction means inwardly thereof adjacent said first valve seat creating a first control chamber in said bore between said first reaction means and said first valve seat, said first control chamber being in fluid communication with said second portion of said passage means and said first discharge port, said first valve actuating means having a projection in fluid communication with said return port and adapted to operate said poppet for controlling pressure in said first control chamber;
 a second valve poppet slidably guided in the end of said second bore and biased away from that end, said second poppet having a second valve face inwardly of said end slidably guided in the end of said second bore, a second valve seat affixed in said second bore to said housing, said second seat including a second face on which said poppet abuts to form a second pressure chamber in said second bore, which second pressure chamber is in fluid communication with said first pressure chamber and said inlet port by said first portion of said passage means, a second valve actuating means having a second reaction means inwardly thereof adjacent said second valve seat and said second poppet creating a second control chamber in said second bore between said reaction means and said second valve seat, said second control chamber being in fluid communication with said second discharge port, said second valve actuating means having a tubular projection in fluid communication with said first control chamber via said second portion of said passage means and adapted to operate said second poppet for controlling pressure in said second control chamber; and
 operator-operated control means including a reciprocating member operatively connected to said first valve actuating means and a lever pivoted to said housing and operatively connected to said second valve actuating means whereby operation of said first valve actuating means will direct fluid pressure from said inlet port through said first valve seat to said first control chamber to said tubular projection of said second valve actuating means to said second control chamber whereby fluid pressure is exhausted from both said first discharge port and said second discharge port and operation of said lever will direct fluid pressure from said second pressure chamber to said second control chamber to said second discharge port with the communication of said second control chamber with said first control chamber being terminated by the abutment of said tubular projection of said second valve actuating means on said second valve poppet.

6. Control means according to claim 5 wherein said tubular projection of said first valve actuating means and said tubular projection of said second valve actuating means includes shoulders abutting, respectively, said first and second reaction means on respective greater and lesser areas such that reaction from pressure in said first control chamber will provide greater feel to said first valve actuating means than reaction from pressure in said second control chamber provides to said second valve actuating means.

7. Control means comprising:
a housing including,
    a first stepped bore,
    a second stepped bore,
    passage means between said first bore and said second bore,
    an inlet port communicated to a first portion of said passage means,
    a return port communicated to said first bore and via a second portion of said passage means to said second bore,
    a first discharge port in communication with said first bore, and
    a second discharge port in communication with said second bore;
a first valve means in said first bore including,
    a first valve poppet having a first tubular body slidably guided in the end of said first bore and biased away from that end, said first tubular body having a first valve face spaced inwardly of a free end of said first tubular body, said first tubular body being formed to have a reduced diameter portion between said free end and said first valve face with said free end and said slidably guided end of equal cross sectional area,
    a first annular valve seat affixed in said first bore to said housing, said first valve seat including a first face on which said first valve face abuts to form a first pressure chamber in said first bore, which first pressure chamber is in fluid communication with said first portion of said passage means,
    a first sleeve in said bore having a first annular deformable body inwardly thereof adjacent said first valve seat and the free end of said first tubular body creating a first control chamber in said bore between said first deformable body and said first valve seat, said first control chamber being in fluid communication with said second portion of said passage means and said first discharge port,
    a first valve actuating means operatively connected to said first sleeve within said first bore, said first valve actuating means having a tubular projection in fluid communication with said return port and adapted to operate against the free end of said first tubular body for controlling pressure in said first control chamber,
    a first collar affixed to said housing and sealingly closing said bore about said first sleeve and said first valve actuating means;
a second valve means in said second bore including,
    a second valve poppet having a second tubular body slidably guided in the end of said second bore and biased away from that end, said second tubular body having a second valve face spaced inwardly of a free end of said second tubular body, said second tubular body being formed to have a reduced diameter portion between said free end and said second valve face with said free end and said slidably guided end of equal cross sectional area, a second annular valve seat affixed in said second more to said housing, said second seat including a second face on which said second valve face abuts to form a second pressure chamber in said second bore, which second pressure chamber is in fluid communication with said inlet port and said first portion of said passage means,
    a second sleeve in said second bore having a second annular body inwardly thereof adjacent said second valve seat and the free end of said second tubular body creating a second control chamber in said second bore between said second deformable body and said second valve seat, said second control chamber being in fluid communication with said second discharge port,
    a second valve actuating means operatively connected to said second sleeve within said second bore, said second valve actuating means having a tubular projection in fluid communication with said first control chamber via said second portion of said passage means and adapted to operate against the free end of said second tubular body for controlling pressure in said second control chamber,
    a second collar affixed to said housing and sealingly closing said second bore about said second sleeve and said second valve actuating means; and
operator-operated control means including a reciprocating member operatively connected to said first valve actuating means and a lever pivoted to said housing and operatively connected to said second valve actuating means whereby operation of said first valve actuating means will direct fluid pressure from said inlet port through said first annular valve seat to said first control chamber to said tubular projection of said second valve actuating means to said second control chamber and operation of said lever will direct fluid pressure from said second pressure chamber to said second control chamber to said second discharge port.

8. Control means comprising:
a housing including,
    a first stepped bore,
    a second stepped bore,
    passage means between said first bore and said second bore,
    an inlet port communicated to a first portion of said passage means,
    a return port communicated to said first bore and via a second portion of said passage means to said second bore,
    a first discharge port in communication with said first bore, and
    a second discharge port in communication with said second bore;
a first valve means in said first bore including,
    a first valve poppet having a first tubular body slidably guided in the end of said first bore and biased away from that end, said first tubular body having a first valve face spaced inwardly of a free end of said first tubular body, said first tubular body being formed to have a reduced diameter portion between said free end and said first valve face with said free end and said slidably guided end of equal cross sectional area,
    a first annular valve seat affixed in said first bore to said housing, said first valve seat including a first deformable face on which said first valve face abuts to form a first pressure chamber in said first bore, which first pressure chamber is in fluid communication with said first portion of said passage means, a first sleeve in said bore having a first annular deformable body inwardly thereof adjacent said first valve seat and the free end of said first tubular body creating a first control chamber in said bore between said first deformable body and said first valve seat, said first control chamber being in fluid communication with said second portion of said passage means and said first discharge port, a first valve actuating means operatively connected to said first sleeve within said first bore, said first valve actuating means having a tubular projection in fluid communication with said return port and adapted to operate against the free end of said first tubular body for controlling pressure in said first control chamber, a first collar affixed to said housing and sealingly closing said bore about said first sleeve and said first valve actuating means;

a second valve means in said second bore including a second valve poppet having a second tubular body slidably guided in the end of said second bore and biased away from that end, said second tubular body having a second valve face spaced inwardly of a free end of said second tubular body, said second tubular body being formed to have a reduced diameter portion between said free end and said second valve face with said free end and said slidably guided end of equal cross sectional area, a second annular valve seat affixed in said second bore to said housing, said second seat including a second deformable face on which said second valve face abuts to form a second pressure chamber in said second bore, which second pressure chamber is in fluid communication with said inlet port and said first portion of said passage means, a second sleeve in said second bore having a second annular deformable body inwardly thereof adjacent said second valve seat and the free end of said second tubular body creating a second control chamber in said second bore between said second deformable body and said second valve seat, said second control chamber being in fluid communication with said second discharge port, a second valve actuating means operatively connected to said second sleeve within said second bore, said second valve actuating means having a tubular projection in fluid communication with said first control chamber via said second portion of said passage means and adapted to operate against the free end of said second tubular body for controlling pressure in said second control chamber, a second collar affixed to said housing and sealingly closing said second bore about said second sleeve and said second valve actuating means; and operator-operated control means including a reciprocating member operatively connected to said first valve actuating means and a lever pivoted to said housing and operatively connected to said second valve actuating means whereby operation of said first valve actuating means will direct fluid pressure from said inlet port through said first annular valve seat to said first control chamber to said tubular projection of said second valve actuating means to said second control chamber and operation of said lever will direct fluid pressure from said second pressure chamber to said second control chamber to said second discharge port.

9. Control means according to claim 8 wherein said tubular projection of said first valve actuating means and said tubular projection of said second valve actuating means including shoulders abutting, respectively, said first and said second deformable body on respective greater and lesser areas such that reaction from pressure in said first control chamber will provide greater feel to said first valve actuating means than reaction from pressure in said second control chamber provides to said second valve actuating means.

References Cited
UNITED STATES PATENTS

| 2,373,450 | 4/1945 | Boldt. | |
| 3,061,382 | 10/1962 | Alfieri | 303—53 |
| 3,265,447 | 8/1966 | Bueler | 303—54 X |

MILTON BUCHLER, *Primary Examiner.*

J. J. McLAUGHLIN, JR., *Assistant Examiner.*

U.S. Cl. X.R.

137—596.14, 596.18, 637.1; 303—7, 10